Oct. 6, 1931.  E. W. BUTLER ET AL  1,826,598
METHOD OF MIXING LIQUIDS
Filed April 16, 1930  2 Sheets-Sheet 1
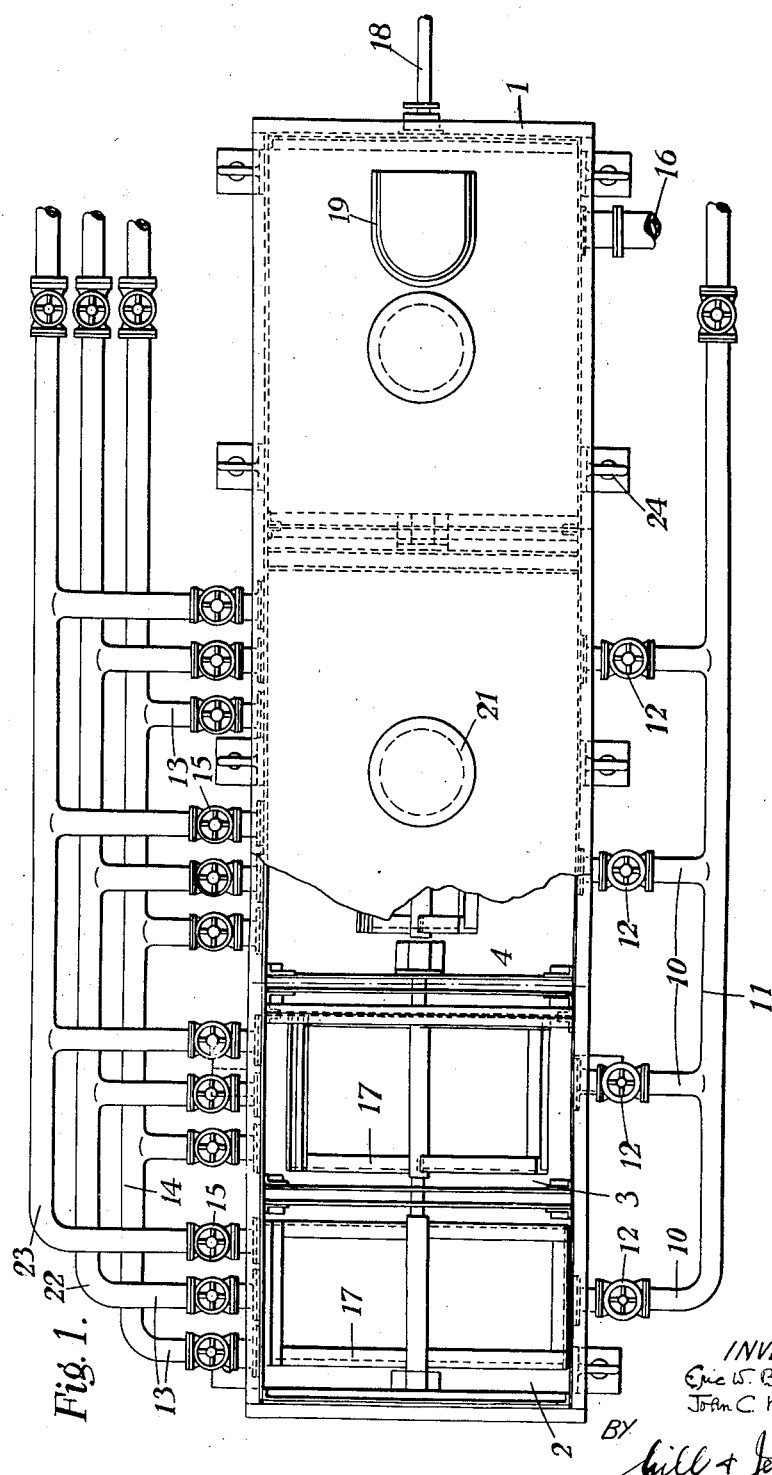
INVENTORS
Eric W. Butler
John C. Mann
BY
Gill & Jennings
ATTORNEYS

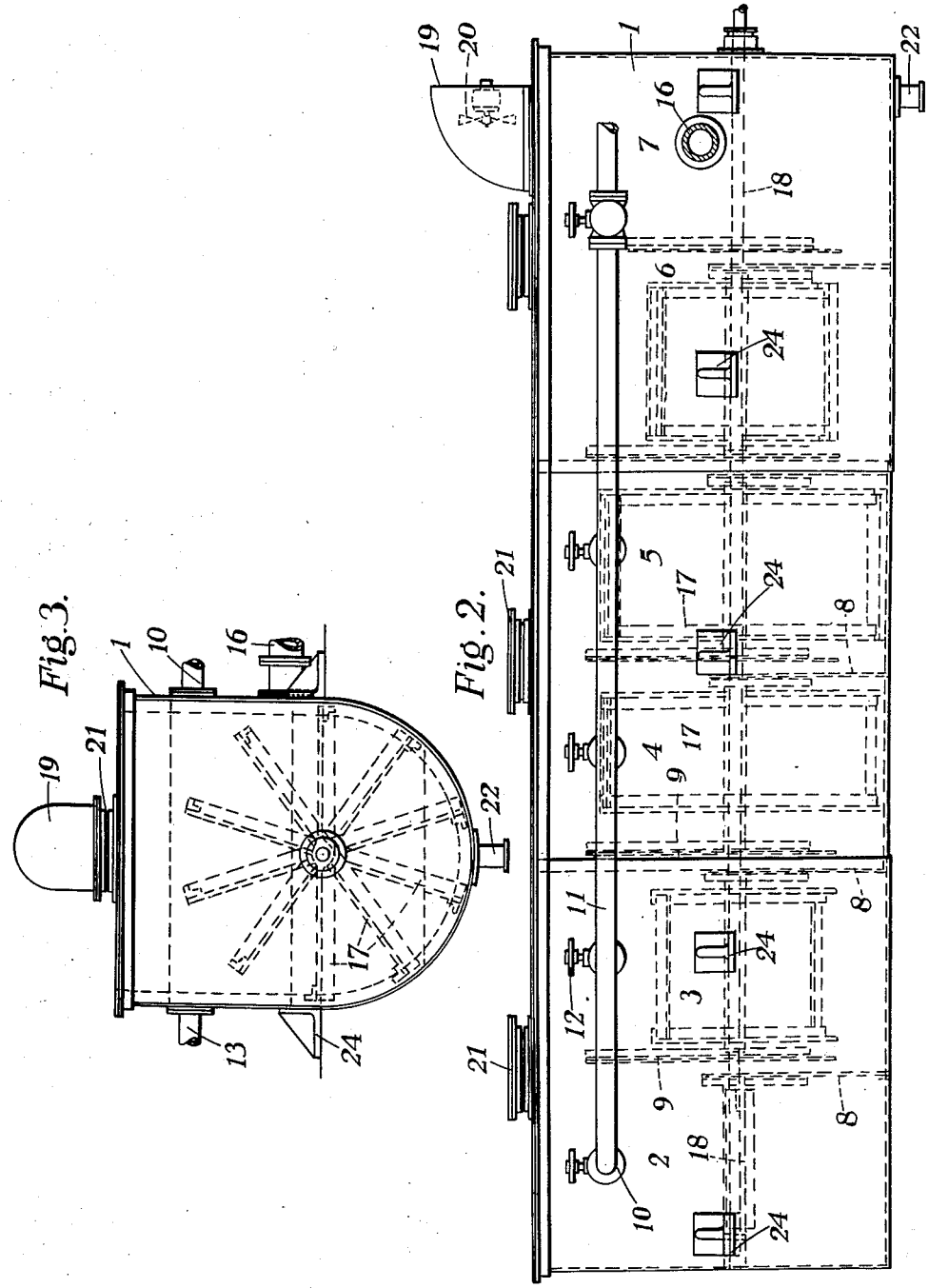

Patented Oct. 6, 1931

1,826,598

UNITED STATES PATENT OFFICE

ERIC WAKEFIELD BUTLER, OF ST. PHILIPS, BRISTOL, AND JOHN CHRISTOPHER MANN, OF BIRMINGHAM, ENGLAND

METHOD OF MIXING LIQUIDS

Application filed April 16, 1930, Serial No. 444,853, and in Great Britain January 19, 1929.

This invention relates to processes of continuously mixing together in the liquid state a tarry substance solid at ordinary temperature and a tarry substance liquid at ordinary temperature which substances are initially at different temperatures, but the mixture of which is to be kept within definite temperature limits. This is the case, for example, when a bituminous material such as hot pitch has to be mixed with a tarry material such as virgin tar, residual oil and creosote, or any of them and there is water present. When such liquids are mixed, if the temperature is allowed at any instant to rise too much, frothing results, with, of course, an enormous increase in volume which leads to considerable loss and inconvenience. On the other hand, if the temperature is allowed to fall too low in relation to the melting point of the pitch, the condition known as stringing results, that is the bituminous material coagulates into stringy lumps. It is highly important, therefore to maintain the temperature of the mixture between certain known limits.

According to the present invention the liquids are mixed in a continuous process by passing one liquid through a series of mixing vessels or compartments and adding in some at least of the mixing vessels or compartments such quantities of one or more other liquids with or without further quantities of the first liquid as will give in each compartment or vessel a resultant mixture having a temperature within the desired temperature limits. A free surface is maintained in all of the mixing vessels or compartments and the mixture is agitated during its passage through them. The quantities of liquids added in the various compartments are such that any violent local action due to a relatively large addition of one liquid at a single point is avoided.

The liquid may be caused to flow from the top of one chamber into the bottom of the next. The transfer between the compartments may also be so arranged that the mixture passing from the one compartment or vessel to the next is heated or cooled as the case may be, so that it is ready to receive in the next compartment additional quantities of the cooler or hotter liquid. In such a case the heat transfer which takes place while the mixture is passing through two compartments need not necessarily be considerable, since by adopting the method of procedure according to the present invention the great advantage is obtained that the physical properties of the resultant liquid vary from compartment to compartment, so that the higher or lower limit of temperature at which ill effects show themselves is raised or lowered at the process continues.

In order that the invention may be clearly understood and readily carried into effect, a process in accordance therewith will now be described by way of example with reference to the accompanying drawings in which Figure 1 is a plan of an apparatus (with part of the cover broken away) in which the process may conveniently be carried out.

Figure 2 a side elevation, and

Figure 3 an end elevation of the apparatus.

This apparatus which is particularly adapted for mixing pitch with virgin tar comprises a closed vessel 1 with straight sides and semicircular bottom, the vessel being divided into six separate compartments 2, 3, 4, 5, 6, 7. Each of the partitions is made double and comprises a plate 8 extending upwards from the bottom of the vessel so as to constitute a weir, and a second plate 9 extending downwards from near the top of the vessel 1 to near the bottom; these two plates 8 and 9 are slightly spaced away from one another so as to allow free passage of the liquid between them. Each of the compartments 2, 3, 4 and 5 is provided on the one side with an inlet 10 branching from a pipe 11 and controlled by a valve 12, and on the other side with three inlets 13 branching from pipes 14, 22 and 23 and controlled by valves 15. The compartment 6 is not provided with any inlet or outlet pipe, but the compartment 7 has an outlet pipe 16 which is placed at about the level of the top of the plates 8.

Each compartment is also provided with a stirring apparatus comprising an iron frame 17, each frame being mounted upon part of a single shaft 18, extending through the whole vessel, and being of such a size that in rotating it nearly touches the semicircular part of the vessel 1. The various stirring frames 17 are set at different angles relatively to one another, so that only one stirrer is breaking through the surface at any one time.

The apparatus is carried by brackets 24 which rest upon columns and the brickwork is so arranged that a furnace can be formed beneath the apparatus so that one or more of the compartments can be heated if necessary.

The above apparatus is described and claimed in our co-pending application, Serial No. 376,374, filed July 6, 1929, matured into Pat. No. 1,809,672.

A typical process is then as follows: Initially, tar at about 75° C. is admitted to the first three compartments through the inlet 13. Hot pitch, at a temperature well over 100° C., is then added through the inlet 10 and thereafter tar at about 40° C. is admitted to the compartments 2, 3 and 4 through the inlets 13, and pitch to the compartments 2 and 3 through the inlets 10. The temperature at which the hot pitch is added would normally result in the occurrence of frothing, but the proportions of the pitch and the tar are so regulated that neither frothing nor stringing takes place. For example, supposing that the tar is at 40° C. and contains 5 per cent of water, and the pitch of melting point of 100° C. is at 250° C., then in the whole apparatus 1 part by volume of pitch may be added to 3 parts by volume of tar without either frothing or stringing taking place. The liquids are, of course, added continuously through the pipes 11 and 14 and the amounts flowing to the various compartments are controlled by the valves 12 and 15. The control is such that the temperature in the first compartment 2 is maintained at about 90° C. with a maximum of 100° C. and gradually decreases in the successive compartments to about 75° C. in compartment 7. As the mixture progresses through the apparatus the proportion of pitch to tar can be varied, since the temperature at which stringing occurs falls and that at which frothing occurs rises as the tar is added to the pitch, and water is evaporated from the mixture. Thus, owing to the latter feature not only does the water content become considerably lower, but, on account of the removal of the latent heat the temperature of the mixture falls considerably, with the result that the risk of frothing is very much reduced.

No further liquid is added in compartments 5, 6 and 7, but the complete mixture is stirred in those compartments. The mixture flows out through the overflow pipe 16 which thus serves to regulate the level of the liquid in all the compartments, and which is so placed that the stirrers 17 always break through the surface of the liquid; this adds considerably to the stirring effect and also assists to break down any froth formed.

It will be appreciated that by the provision of the plates 8 and 9 the mixture is always transferred from the top of one compartment to the bottom of the next; this ensures thorough mixing of the two liquids, since any viscous material is brought to the top of the liquid and mixed with incoming lighter or thinner material before flowing to the next compartment.

Since the plates 9 do not extend completely to the top of the vessel 1 all the compartments 2, 3, 4, 5, 6, 7 are in communication with one another at the top. A hood 19 is arranged at the top of compartment 7 and a fan 20 is mounted in it so that the vapours given off from any of the compartments can be drawn off through the hood 19 by means of the fan 20, and condensed.

Three manholes 21 are arranged for cleaning purposes, each immediately above one of the partitions so that each manhole gives access to two compartments. A drain-cock 22 is provided at the bottom of the compartment number 7, and in order that the whole vessel may be drained by this cock, small holes are formed in the plates 8 at the bottom.

In cases where it is desired to take off all the moisture and light vapours, a vacuum may be maintained above the free surfaces of the liquid in the compartments.

It will be appreciated that the invention is not limited to the precise method described by way of example. In particular the invention is applicable to the mixing of a number of liquids at the same time, and is not limited to mixing two liquids only. In fact it is in order to allow of mixing several different liquids that there are three separate inlet pipes 14, 22 and 23 in the apparatus illustrated in the drawings, so that with this apparatus four different liquids can be mixed together at one time, these liquids passing, of course, through the pipes 11, 14, 22 and 23.

It is to be understood that the claims are not limited to the precise method described, since clearly modifications may be made and, therefore, the claims are intended to be construed to cover all such modifications as their language will allow in the light of the prior art.

We claim:—

1. In a continuous process of mixing together in the liquid state a tarry substance solid at ordinary temperature and a tarry substance liquid at ordinary temperature which substances are initially at different temperatures but the mixture of which is to be kept within definite temperature limits such as to prevent stringing or frothing of one of the substances, the steps which comprise passing one substance through a series of mixing chambers selectively adding in some at least of said mixing chambers the other substance at a temperature such as would normally cause frothing but in such quantities as will give in each mixing chamber a resultant mixture having a temperature within the said temperature limits, maintaining in all of said mixing chambers a free surface of the liquid substances, and agitating the mixture during its passage through said chambers.

2. In a continuous process of mixing together in the liquid state a tarry substance solid at ordinary temperature and a tarry substance liquid at ordinary temperature which substances are initially at different temperatures but the mixture of which is to be kept within definite temperature limits such as to prevent stringing or frothing of one of the substances, the steps which comprise passing one substance through a series of mixing chambers, adding to such substance in its passage through said mixing chambers the other substance at a temperature such as would normally cause frothing but in such quantities as will give in each mixing chamber a resultant mixture having a temperature within the said temperature limits, maintaining in all of said mixing chambers a free surface of the liquid substances, heat treating said mixture in said mixing chambers, and agitating the mixture during its passage through said chambers.

3. In a continuous process of mixing together in the liquid state a tarry substance solid at ordinary temperature and a tarry substance liquid at ordinary temperature which substances are initially at different temperatures but the mixture of which is to be kept within definite temperature limits such as to prevent stringing or frothing of one of the substances, the steps which comprise passing one substance through a series of mixing chambers by causing it to flow from the top of one chamber into the bottom of the next, selectively adding in some at least of said mixing chambers the other substance at a temperature such as would normally cause frothing but in such quantities as will give in each mixing chamber a resultant mixture having a temperature within the said temperature limits, maintaining in all of said mixing chambers a free surface of the liquid substances, and agitating the mixture during its passage through said chambers.

4. In a continuous process of mixing together in the liquid state and a tarry substance solid at ordinary temperature and a tarry substance liquid at ordinary temperature which substances are initially at different temperatures but the mixture of which is to be kept within definite temperature limits such as to prevent stringing of one of the substances or frothing due to the presence of water, the steps which comprise passing one substance through a series of mixing chambers, selectively adding in some at least of said mixing chambers quantities of the other substance, together with further quantities of said first-mentioned substance, the quantities of said other substance being added in such proportion as will give in each mixing chamber a resultant mixture having a temperature within the said temperature limits, maintaining in all of said mixing chambers a free surface of the liquid substances, and agitating the mixture during its passage through said chambers.

5. In a continuous process of mixing together in the liquid state a tarry substance solid at ordinary temperature and a tarry substance liquid at ordinary temperature which substances are initially at different temperatures but the mixture of which is to be kept within definite temperature limits such as to prevent stringing or frothing of one of the substances, the steps which comprise passing one substance through a series of mixing chambers, selectively adding in some at least of said mixing chambers the other substance at a temperature such as would normally cause frothing but in such quantities as will give in each mixing chamber a resultant mixture having a temperature within the said temperature limits, maintaining in all of said mixing chambers a free surface of the liquid substances, maintaining the space above said free surface at atmospheric pressure, and agitating the mixture during its passage through said chambers.

6. In a continuous process of mixing together in the liquid state a tarry substance solid at ordinary temperature and a tarry substance liquid at ordinary temperature which substances are initially at different temperatures but the mixture of which is to be kept within definite temperature limits such as to prevent stringing or frothing of one of the substances, the steps which comprise passing one substance through a series of mixing chambers, selectively adding in some at least of said mixing chambers the other substance at a temperature such as would normally cause frothing but in such quantities as will give in each mixing chamber a resultant mixture having a temperature within the said temperature limits, maintaining in all of said mixing chambers a free surface of the liquid substances maintaining the space above said free surface at atmospheric pressure, agitating the mixture and concurrently breaking the said free surface during the passage of the mixture through said chambers.

7. In a continuous process of mixing together in the liquid state pitch which is solid at ordinary temperature and crude tar which is liquid at ordinary temperature, the pitch and tar being initially at different temperatures but the mixture of which is to be kept within definite temperature limits such as to prevent stringing, or frothing of the tar due to the presence of water therein, the steps which comprise passing the tar through a series of mixing chambers, selectively adding in some at least of said mixing chambers such quantities of pitch at a temperature above 100° C. as will give in each mixing chamber a resultant mixture having a temperature within the said temperature limits, maintaining in all of said mixing chambers a free surface of the liquid mixture, and agitating the mixture during its passage through said chambers.

8. In a continuous process of mixing together in the liquid state pitch which is solid at ordinary temperature and crude tar which is liquid at ordinary temperature, the pitch and tar being initially at different temperatures but the mixture of which is to be kept within definite temperature limits such as to prevent stringing, or frothing of the tar due to the presence of water therein, the steps which comprise passing the tar through a series of mixing chambers, by causing it to flow from the top of one chamber into the bottom of the next, selectively adding in some at least of said mixing chambers such quantities of the pitch at a temperature above 100° C. as will give in each mixing chamber a resultant mixture having a temperature within the said temperature limits, maintaining in all of said mixing chambers a free surface of the liquid mixture, and agitating the mixture during its passage through the said chambers.

In witness whereof we hereunto subscribe our names this 8th day of April, 1930.

ERIC WAKEFIELD BUTLER.
JOHN CHRISTOPHER MANN.